United States Patent
Kobayashi et al.

(10) Patent No.: US 10,763,694 B2
(45) Date of Patent: Sep. 1, 2020

(54) UNINTERRUPTIBLE POWER SUPPLY

(71) Applicant: FUJI ELECTRIC CO., LTD., Kawasaki-shi, Kanagawa (JP)

(72) Inventors: Hiroyuki Kobayashi, Kobe (JP); Hiroki Muratsu, Kobe (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 263 days.

(21) Appl. No.: 16/017,213

(22) Filed: Jun. 25, 2018

(65) Prior Publication Data

US 2019/0052122 A1 Feb. 14, 2019

(30) Foreign Application Priority Data

Aug. 8, 2017 (JP) .................. 2017-153101

(51) Int. Cl.
*H02J 9/00* (2006.01)
*H02J 9/06* (2006.01)

(52) U.S. Cl.
CPC ............... *H02J 9/062* (2013.01); *H02J 9/068* (2020.01)

(58) Field of Classification Search
USPC ......................................................... 307/66
See application file for complete search history.

(56) References Cited

U.S. PATENT DOCUMENTS

| 7,268,994 B2 * | 9/2007 | Kondo | H01H 47/002 361/160 |
| 2008/0054722 A1 * | 3/2008 | Phelps | H02J 9/061 307/64 |
| 2014/0049114 A1 * | 2/2014 | Chen | H01H 47/22 307/75 |

FOREIGN PATENT DOCUMENTS

JP  2008-283788 A  11/2008

* cited by examiner

*Primary Examiner* — Rexford N Barnie
*Assistant Examiner* — Dru Parries
(74) *Attorney, Agent, or Firm* — Manabu Kanesaka

(57) ABSTRACT

An uninterruptible power supply includes an AC power source that supplies AC power to a load and includes a main AC input power source, an electromagnetic contactor provided between the AC power source and the load and excited to be switched on or off, and a first switch that switches between a first AC voltage of the main AC input power source and a second AC voltage capable of being supplied independently of the first AC voltage so as to excite the electromagnetic contactor.

9 Claims, 5 Drawing Sheets

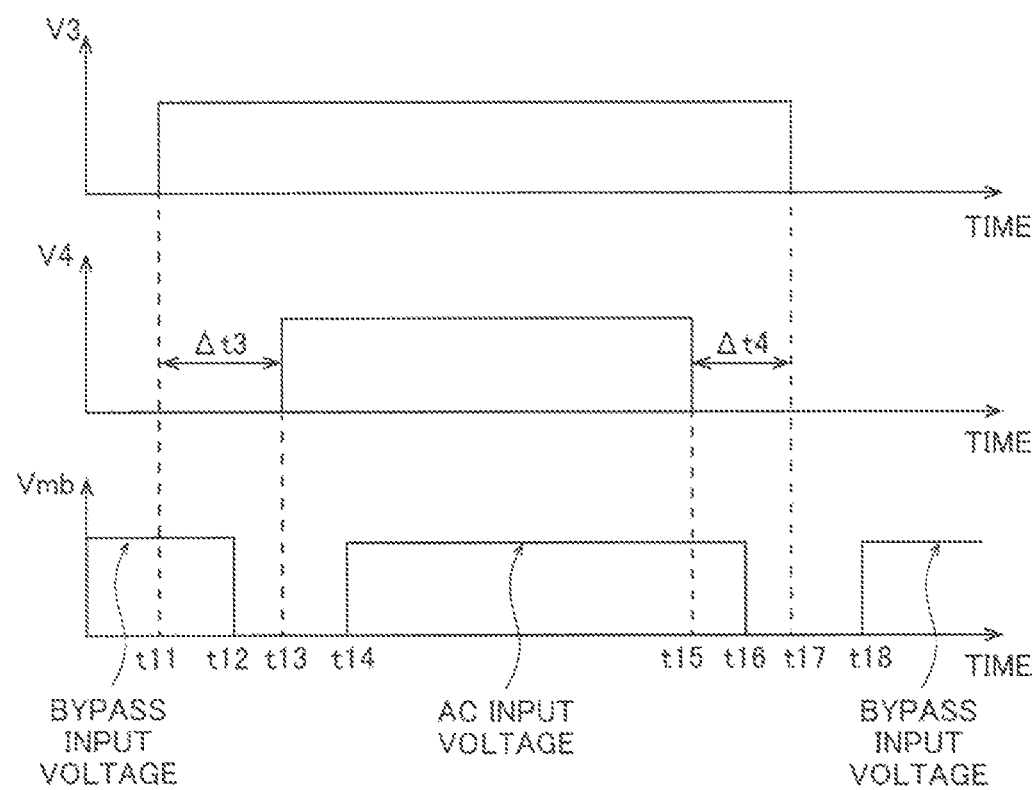

//UNINTERRUPTIBLE POWER SUPPLY

CROSS-REFERENCE TO RELATED APPLICATION

The priority application number JP2017-153101, Uninterruptible Power Supply, filed Aug. 8, 2017, Hiroyuki Kobayashi and Hiroki Muratsu, upon which this patent application is based, is hereby incorporated by reference.

BACKGROUND OF THE INVENTION

Field of the Invention

The present invention relates to an uninterruptible power supply, and more particularly, relates to an uninterruptible power supply including an electromagnetic contactor.

Description of the Background Art

An uninterruptible power supply that generates a control power source is known in general, as disclosed in Japanese Patent Laid-Open No. 2008-283788.

An uninterruptible power supply disclosed in Japanese Patent Laid-Open No. 2008-283788 includes a commercial system power source that supplies power to a load. Between the commercial system power source and the load, a converter and an inverter are provided. Between the converter and the inverter, a storage battery is provided. A rectifier that converts AC power into DC power is provided in a path different from a path in which the converter, the inverter, and the storage battery are provided. The uninterruptible power supply further includes a DC power source that generates DC power from AC power of the commercial system power source with the rectifier and a DC power source including a storage battery or the like. A control power source is generated by matching outputs from the two DC power supplies. With such a configuration, during the normal operation of the uninterruptible power supply, the DC power source (DC power) from the commercial system power source (rectifier) side is used as the control power source, and during the backup operation thereof, the DC power source (DC power) from the storage battery side is used as the control power source.

Generally, in order to control power supply to the load, an electromagnetic contactor may be provided between the commercial system power source and the load. Furthermore, when a bypass AC power source that supplies power to the load upon failure of the inverter, for example, is provided, an electromagnetic contactor may be provided between the bypass AC power source and the load. When an electromagnetic contactor is provided in the uninterruptible power supply described in Japanese Patent Laid-Open No. 2008-283788, the electromagnetic contactor is conceivably controlled to be turned on or off by being excited (demagnetized) by the generated control power source (DC voltage).

Generally, an electromagnetic contactor may be driven by an AC voltage instead of a DC voltage. In an uninterruptible power supply that drives an electromagnetic contactor with an AC voltage, an AC power source (a commercial AC power source or bypass AC power source) may not be able to supply an AC voltage when an abnormality such as a power failure occurs. In this case, no AC voltage is applied to the electromagnetic contactor, and hence it is difficult to appropriately control the electromagnetic contactor.

SUMMARY OF THE INVENTION

The present invention has been proposed in order to solve the aforementioned problem, and an object of the present invention is to provide an uninterruptible power supply capable of appropriately driving an electromagnetic contactor even in the event of an abnormality such as a power failure when driving the electromagnetic contactor with an AC voltage.

In order to attain the aforementioned object, an uninterruptible power supply according to an aspect of the present invention includes an AC power source that supplies AC power to a load and includes a main AC input power source, an electromagnetic contactor provided between the AC power source and the load and excited to be switched on or off, and a first switch that switches between a first AC voltage from the main AC input power source and a second AC voltage capable of being supplied independently of the first AC voltage so as to excite the electromagnetic contactor.

In the uninterruptible power supply according to this aspect of the present invention, as described above, the first switch switches between the first AC voltage from the main AC input power source and the second AC voltage capable of being supplied independently of the first AC voltage so as to excite the electromagnetic contactor. Thus, even when one of the first AC voltage and the second AC voltage cannot be supplied to the electromagnetic contactor due to a power failure or the like, the other of the first AC voltage and the second AC voltage can be supplied to the electromagnetic contactor. Consequently, the electromagnetic contactor can be appropriately driven (excited) even when one of the first AC voltage and the second AC voltage cannot be supplied to the electromagnetic contactor in the event of an abnormality such as a power failure.

In the aforementioned uninterruptible power supply according to this aspect, the first switch preferably includes at least one switching relay, and the switching relay preferably switches between the first AC voltage and the second AC voltage so as to excite the electromagnetic contactor. According to this structure, the switching relay can easily switch between the first AC voltage and the second AC voltage so as to drive (excite) the electromagnetic contactor.

In this case, the first switch preferably includes a first switching relay and a second switching relay, and the first switching relay is preferably turned on and the second switching relay is preferably turned off so as to excite the electromagnetic contactor with one of the first AC voltage and the second AC voltage, and the first switching relay is preferably turned off and the second switching relay is preferably turned on so as to excite the electromagnetic contactor with the other of the first AC voltage and the second AC voltage. According to this structure, the first switching relay and the second switching relay can easily switch between the first AC voltage and the second AC voltage so as to drive (excite) the electromagnetic contactor.

In the aforementioned uninterruptible power supply in which the first switch includes the first switching relay and the second switching relay, the first switching relay and the second switching relay are preferably driven based on a common first drive voltage switching signal or a common second drive voltage switching signal, the first switching relay is preferably excited based on the first drive voltage switching signal so as to be turned off, and is preferably demagnetized based on the second drive voltage switching signal so as to be turned on, and the second switching relay is preferably excited based on the first drive voltage switching signal so as to be turned on, and is preferably demagnetized based on the second drive voltage switching signal so as to be turned off. According to this structure, based on the common first drive voltage switching signal or the common second drive voltage switching signal, one of the first switching relay and the second switching relay can be turned on, and the other can be turned off. Consequently, switching control of the first switching relay and the second switching relay can be simplified as compared with the case where the first switching relay and the second switching relay are controlled based on different drive voltage switching signals, respectively.

In this case, the second switching relay is preferably excited based on the first drive voltage switching signal after a predetermined first shifting time from a time when the first switching relay is excited based on the first drive voltage switching signal. In general, there is an individual difference between switching relays in the time taken from excitation to switching on or off. When the first shifting time is not provided, and a time period from when the first switching relay is excited based on the first drive voltage switching signal until when the first switching relay is turned off is longer than a time period from when the second switching relay is excited based on the first drive voltage switching signal until when the second switching relay is turned on, for example, a time period in which both the first switching relay and the second switching relay are in an on-state occurs. Therefore, the first shifting time is provided such that it is possible to significantly reduce or prevent the likelihood that both the first switching relay and the second switching relay are in an on-state. Thus, it is possible to significantly reduce or prevent flowing of a cross current resulting from short-circuiting of a voltage source of the first AC voltage and a voltage source of the second AC voltage.

In the aforementioned uninterruptible power supply in which the second switching relay is excited after the predetermined first shifting time from the time when the first switching relay is excited, the electromagnetic contactor is preferably a normal excitation type electromagnetic contactor, and the predetermined first shifting time is preferably set such that a time period between a time when the first switching relay is excited based on the first drive voltage switching signal to switch to an off-state and a time when the second switching relay is excited based on the first drive voltage switching signal to switch to an on-state is shorter than a recovery time from when the normal excitation type electromagnetic contactor changes from an excited state to a demagnetized state until when the normal excitation type electromagnetic contactor switches to an off-state. Here, no voltage is applied to the normal excitation type electromagnetic contactor (the normal excitation type electromagnetic contactor is demagnetized) between the time when first the switching relay switches to an off-state and the time when the second switching relay switches to an on-state. That is, when the time period between the time when the first switching relay switches to an off-state and the time when the second switching relay switches to an on-state is longer than the recovery time, the normal excitation type electromagnetic contactor is in an off-state at the time when the second switching relay switches to an on-state. Therefore, the predetermined first shifting time is set such that the time period between the time when the first switching relay switches to an off-state and the time when the second switching relay switches to an on-state is shorter than the recovery time, whereby it is possible to significantly reduce or prevent the likelihood that the normal excitation type electromagnetic contactor is in an off-state at the time when the second switching relay switches to an on-state. Thus, the on- and off-states of the normal excitation type electromagnetic contactor can be more appropriately controlled, and hence power supply to the load can be more appropriately performed.

In the aforementioned uninterruptible power supply in which the first switching relay and the second switching relay are driven based on the common first drive voltage switching signal or the common second drive voltage switching signal, the first switching relay is preferably demagnetized based on the second drive voltage switching signal after a predetermined second shifting time from a time when the second switching relay is demagnetized based on the second drive voltage switching signal. In general, there is an individual difference between switching relays in the time taken from demagnetization to switching on or off. When the second shifting time is not provided, and a time period from when the second switching relay is demagnetized based on the second drive voltage switching signal until when the second switching relay is turned off is longer than a time period from when the first switching relay is demagnetized based on the second drive voltage switching signal until when the first switching relay is turned on, for example, a time period in which both the first switching relay and the second switching relay are in an on-state occurs. Therefore, the second shifting time is provided such that it is possible to significantly reduce or prevent the likelihood that both the first switching relay and the second switching relay are in an on-state.

In the aforementioned uninterruptible power supply in which the first switch includes the first switching relay and the second switching relay, a period, during which both the first switching relay and the second switching relay are in an off-state when switching between the first AC voltage from the main AC input power source and the second AC voltage capable of being supplied independently of the first AC voltage so as to excite the electromagnetic contactor, is preferably set. According to this structure, it is possible to easily significantly reduce or prevent the likelihood that both the first switching relay and the second switching relay are in an on-state, and hence it is possible to easily significantly reduce or prevent flowing of a cross current resulting from short-circuiting of the voltage source of the first AC voltage and the voltage source of the second AC voltage.

The aforementioned uninterruptible power supply according to this aspect preferably further includes a second switch that switches an energization state between the first switch and the electromagnetic contactor. According to this structure, the second switch is controlled to be turned on or off such that the state (the excited state or demagnetized state) of the electromagnetic contactor can be easily switched. In addition, the second switch can more reliably insulate a circuit (first switch) that controls the driving (excited state) of the electromagnetic contactor from a main circuit of the uninterruptible power supply.

In the aforementioned uninterruptible power supply according to this aspect, the AC power source preferably further includes a bypass AC input power source, and the electromagnetic contactor preferably includes a first electromagnetic contactor provided between the main AC input power source and the load and a second electromagnetic contactor provided between the bypass AC input power source and the load. The uninterruptible power supply preferably further includes a power storage that stores DC power and a power converter that converts the DC power from the power storage into AC power, and the first switch preferably includes a power converter-side switch that switches between the first AC voltage from the main AC input power source and the second AC voltage as an AC voltage from the power converter so as to excite the first electromagnetic contactor, and a bypass-side switch that switches between the first AC voltage from the main AC input power source and the second AC voltage as an AC voltage from the bypass AC input power source so as to excite the second electromagnetic contactor. According to this structure, in the event of the power failure of the main AC input power source, for example, the first electromagnetic contactor can be driven (excited) by the AC voltage output through the power converter-side switch from the power converter using power in the power storage. Furthermore, when there is an abnormality in wiring between the bypass AC input power source and the second electromagnetic contactor and the AC voltage of the bypass AC input power source is not applied to the second electromagnetic contactor, the second electromagnetic contactor can be driven (excited) by the AC voltage from the main AC input power source through the bypass-side switch.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a time chart for illustrating a switching method of the bypass-side switch according to the embodiment.

DESCRIPTION OF THE PREFERRED EMBODIMENTS

An embodiment of the present invention is hereinafter described with reference to the drawings.

Embodiment

The structure of an uninterruptible power supply (UPS) 100 according to this embodiment is now described with reference to FIGS. 1 to 7.

(Structure of Uninterruptible Power Supply)

Figure 1:
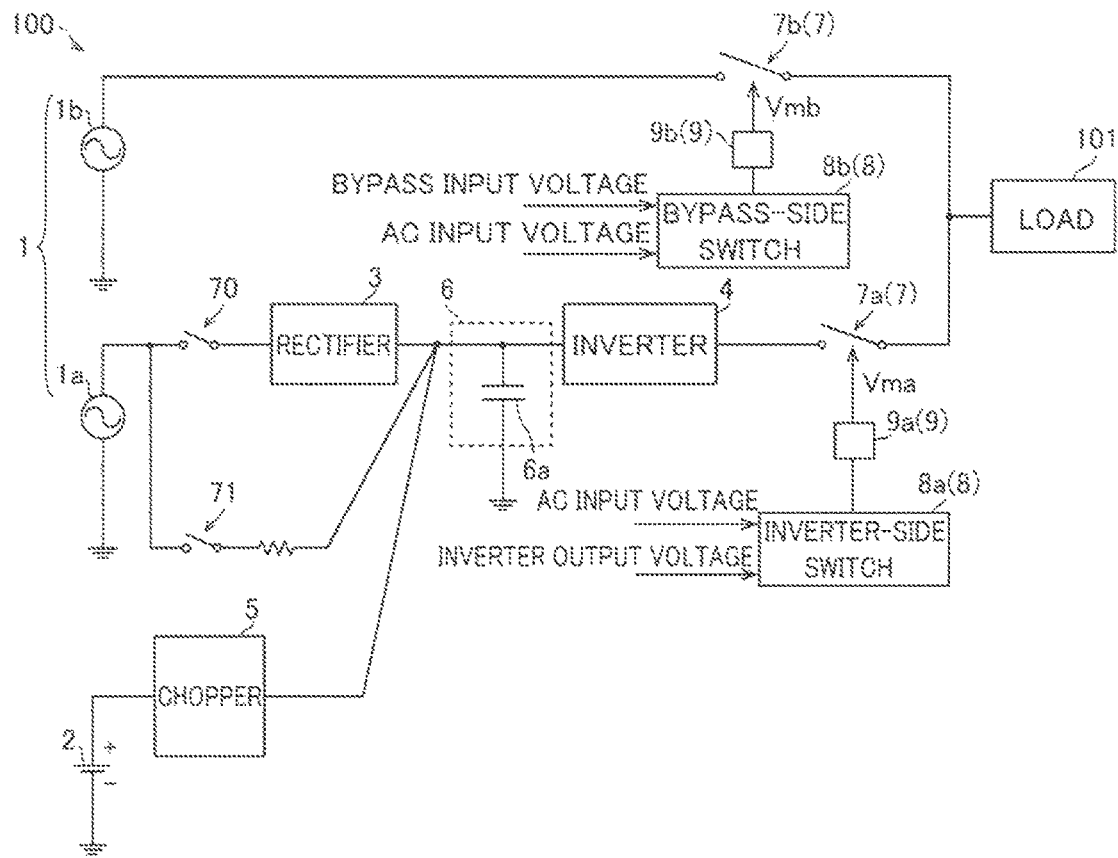
FIG. 1 is a diagram showing the overall structure of an uninterruptible power supply according to an embodiment.

First, the schematic structure of the uninterruptible power supply 100 is described with reference to FIG. 1. As shown in FIG. 1, the uninterruptible power supply 100 includes an AC power source 1. The AC power source 1 includes a main AC input power source 1a and a bypass AC input power source 1b. The uninterruptible power supply 100 further includes a storage battery 2 that stores DC power. During the normal operation of the uninterruptible power supply 100, AC power output from the main AC input power source 1a is supplied to a load 101 connected to the uninterruptible power supply 100. Upon failure of the main AC input power source 1a, for example, a backup operation is performed in which the power stored in the storage battery 2 is supplied to the load 101. Furthermore, upon failure of an inverter 4 described later, for example, AC power output from the bypass AC input power source 1b is supplied to the load 101. The main AC input power source 1a, the bypass AC input power source 1b, and the storage battery 2 can supply a voltage (power) independently of each other. Thus, the uninterruptible power supply 100 prevents interruption of power supply to the load 101. The storage battery 2 is an example of a "power storage" in the claims.

Specifically, the uninterruptible power supply 100 includes a rectifier 3 and the inverter 4. The uninterruptible power supply 100 further includes a chopper 5. The rectifier 3, the inverter 4, and the chopper 5 are each configured as a power conversion circuit that converts input power input thereinto and outputs output power. The rectifier 3 converts the AC power from the main AC input power source 1a into DC power. The inverter 4 converts the DC power supplied from the rectifier 3 or the chopper 5 (storage battery 2) into AC power suitable for the load 101. That is, during the normal operation of the uninterruptible power supply 100, the inverter 4 converts the DC power supplied from the rectifier 3 into AC power and outputs the AC power. During the backup operation of the uninterruptible power supply 100, the inverter 4 converts the DC power supplied from the chopper 5 (storage battery 2) into AC power and outputs the AC power. The inverter 4 is an example of a "power converter" in the claims.

The chopper 5 steps up or steps down the power (DC power) from the storage battery 2 to a voltage usable by the inverter 4 and to supply the stepped-up or stepped-down power to the inverter 4. A capacitor 6a that smooths DC power (voltage) is provided in a DC intermediate portion 6 between the rectifier 3 and the inverter 4.

The uninterruptible power supply 100 includes normal excitation type electromagnetic contactors 7 provided between the AC power source 1 and the load 101. Specifically, the electromagnetic contactors 7 include a normal excitation type electromagnetic contactor 7a provided between the main AC input power source 1a (inverter 4) and the load 101. The electromagnetic contactors 7 further include a normal excitation type electromagnetic contactor 7b provided between the bypass AC input power source 1b and the load 101. Each of the electromagnetic contactor 7a and the electromagnetic contactor 7b is excited to be switched on or off. Specifically, each of the electromagnetic contactor 7a and the electromagnetic contactor 7b is excited to switch to an on-state, and is demagnetized to switch to an off-state. The electromagnetic contactor 7a and the electromagnetic contactor 7b are examples of a "first electromagnetic contactor" and a "second electromagnetic contactor" in the claims, respectively.

According to this embodiment, the uninterruptible power supply 100 includes switches 8. Specifically, the switches 8 include an inverter-side switch 8a that switches between an AC voltage (denoted as an AC input voltage in FIG. 1) from the main AC input power source 1a and an AC voltage (denoted as an inverter output voltage in FIG. 1) from the inverter 4 so as to excite the electromagnetic contactor 7a. In FIG. 1, the voltage applied to the electromagnetic contactor 7a is denoted as a voltage Vma. The switches 8 further include a bypass-side switch 8b that switches between the AC voltage from the main AC input power source 1a and an AC voltage (denoted as a bypass input voltage in FIG. 1) from the bypass AC input power source 1b so as to excite the electromagnetic contactor 7b. In FIG. 1, the voltage applied to the electromagnetic contactor 7b is denoted as a voltage Vmb. The switches 8 and the inverter-side switch 8a are examples of a "first switch" and a "power converter-side switch" in the claims, respectively. The AC voltage from the main AC input power source 1a is an example of a "first AC voltage" in the claims. The AC voltage from the inverter 4 in the inverter-side switch 8a is an example of a "second AC voltage" in the claims. The AC voltage from the bypass AC input power source 1b in the bypass-side switch 8b is an example of a "second AC voltage" in the claims.

According to this embodiment, the uninterruptible power supply 100 includes energization switches 9 that switch energization states between the switches 8 and the electromagnetic contactors 7. Specifically, the energization switches 9 include an inverter-side energization switch 9a provided between the inverter-side switch 8a and the electromagnetic contactor 7a. The energization switches 9 further include a bypass-side energization switch 9b provided between the bypass-side switch 8b and the electromagnetic contactor 7b. Each of the inverter-side energization switch 9a and the bypass-side energization switch 9b is an a-contact mechanical relay. An a-contact relay is a relay excited to be turned on. A b-contact relay is a relay excited to be turned off. The energization switches 9 are examples of a "second switch" in the claims.

An electromagnetic contactor 70 is provided between the main AC input power source 1a and the rectifier 3. During the normal operation of supplying power from the main AC input power source 1a to the load 101, the electromagnetic contactor 70 is turned on. In addition, an electromagnetic contactor 71 is provided on wiring that directly (not through the rectifier 3) connects the main AC input power source 1a to the DC intermediate portion 6. Prior to the normal operation of the uninterruptible power supply 100, the electromagnetic contactor 71 is turned on such that the capacitor 6a is precharged with power. Each of the electromagnetic contactor 70 and the electromagnetic contactor 71 is a normal excitation type electromagnetic contactor, and is excited by the AC voltage of the main AC input power source 1a.

(Structure of Inverter-Side Switch)

Next, the structure of the inverter-side switch 8a is described in detail below with reference to FIGS. 2 to 4.

Figure 2:
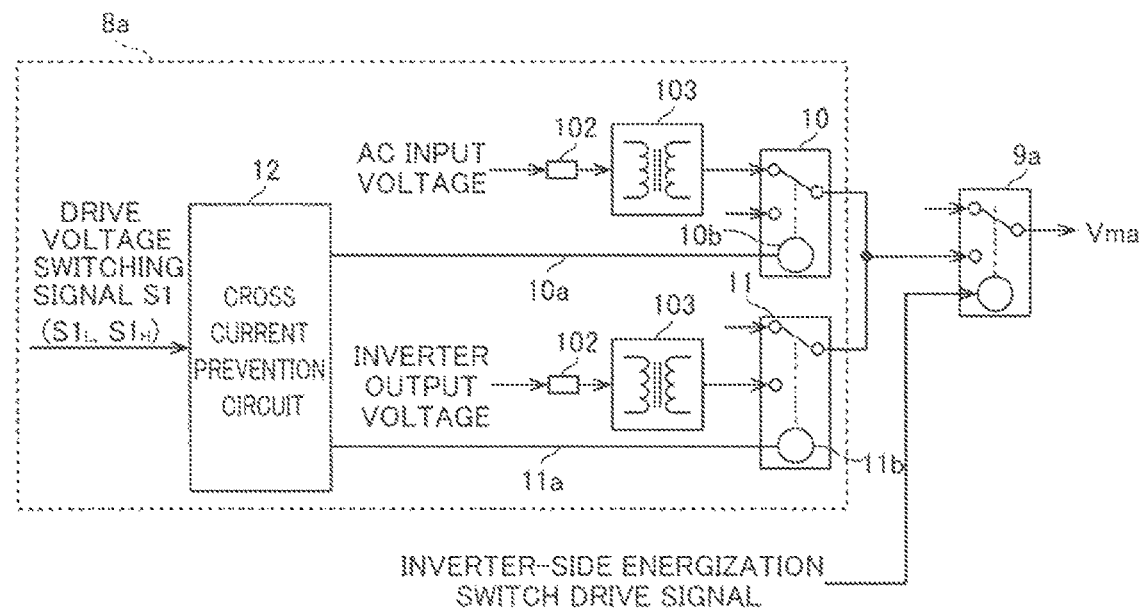
FIG. 2 is a diagram showing the structure of an inverter-side switch of the uninterruptible power supply according to the embodiment.

As shown in FIG. 2, the inverter-side switch 8a includes at least one switching relay. Specifically, the inverter-side switch 8a includes a switching relay 10 and a switching relay 11. The switching relay 10 is a b-contact mechanical relay. The AC voltage (AC input voltage) from the main AC input power source 1a (see FIG. 1) is input into the switching relay 10. The switching relay 11 is an a-contact mechanical relay. The AC voltage (inverter output voltage) from the inverter 4 (see FIG. 1) is input into the switching relay 11. The AC voltage is input into each of the switching relay 10 and the switching relay 11 via fuses 102 and transformers 103. The switching relay 10 and the switching relay 11 are examples of a "first switching relay" and a "second switching relay" in the claims, respectively.

According to this embodiment, the uninterruptible power supply 100 (see FIG. 1) turns on the switching relay 10 and turns off the switching relay 11 so as to excite the electromagnetic contactor 7a with the AC voltage of the main AC input power source 1a (see FIG. 1). In this case, both the switching relay 10 and the switching relay 11 are demagnetized. Specifically, the switching relay 10 is turned on, and the switching relay 11 is turned off such that the AC voltage of the main AC input power source 1a is input into the inverter-side energization switch 9a via the switching relay 10. The AC voltage of the inverter 4 is shut off by the switching relay 11 in an off-state. In this case, when the inverter-side energization switch 9a is in an on-state, the AC voltage of the main AC input power source 1a is applied to the electromagnetic contactor 7a. The inverter-side energization switch 9a is switched on or off by an inverter-side energization switch drive signal input thereinto.

Furthermore, the uninterruptible power supply 100 turns off the switching relay 10 and turns on the switching relay 11 so as to excite the electromagnetic contactor 7a (see FIG. 1) with the AC voltage of the inverter 4 (see FIG. 1). In this case, both the switching relay 10 and the switching relay 11 are excited. Specifically, the switching relay 10 is turned off, and the switching relay 11 is turned on such that the AC voltage of the inverter 4 is input into the inverter-side energization switch 9a via the switching relay 11. The AC voltage of the main AC input power source 1a is shut off by the switching relay 10 in an off-state. In this case, when the inverter-side energization switch 9a is in an on-state, the AC voltage of the inverter 4 is applied to the electromagnetic contactor 7a.

The inverter-side switch 8a includes a cross current prevention circuit 12. A single drive voltage switching signal S1 is input into the cross current prevention circuit 12. The cross current prevention circuit 12 is connected to an operating coil 10b of the switching relay 10 via wiring 10a. In addition, the cross current prevention circuit 12 is connected to an operating coil 11b of the switching relay 11 via wiring 11a.

According to this embodiment, the switching relay 10 and the switching relay 11 are driven based on a common first drive voltage switching signal $S1_L$ or a common second drive voltage switching signal $S1_H$. The first drive voltage switching signal $S1_L$ is a drive voltage switching signal S1 in a low level state, and the second drive voltage switching signal $S1_H$ is a drive voltage switching signal S1 in a high level state.

The switching relay 10 is turned off by being excited based on the first drive voltage switching signal $S1_L$, and is turned on by being demagnetized based on the second drive voltage switching signal $S1_H$. The switching relay 11 is turned on by being excited based on the first drive voltage switching signal $S1_L$, and is turned off by being demagnetized based on the second drive voltage switching signal $S1_H$.

Specifically, when a low-level signal (first drive voltage switching signal $S1_L$) is input into the cross current prevention circuit 12, a current flows through the wiring 10a and the operating coil 10b, and the switching relay 10 is excited and turned off. In this case, a current also flows through the wiring 11a and the operating coil 11b, and the switching relay 11 is excited and turned on. When a high-level signal (second drive voltage switching signal $S1_H$) is input into the cross current prevention circuit 12, no current flows through the wiring 10a and the operating coil 10b, and the switching relay 10 is demagnetized and turned on. In this case, no current flows through the wiring 11a and the operating coil 11b, and the switching relay 11 is demagnetized and turned off. Details are described with reference to FIG. 3. In FIG. 3, the fuses 102 (see FIG. 2) and the transformers 103 (see FIG. 2) are not shown for the sake of simplicity.

Figure 3:
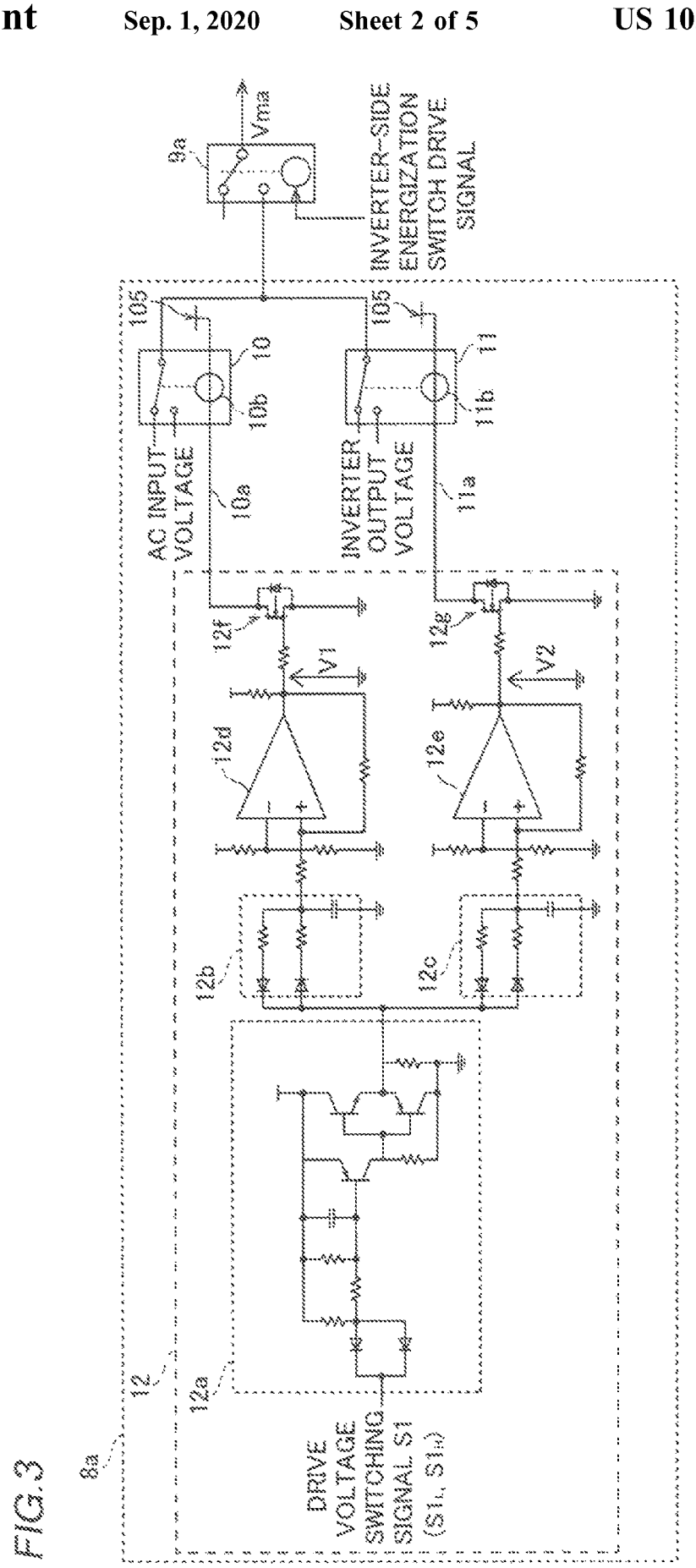
FIG. 3 is a diagram showing the detailed structure of the inverter-side switch according to the embodiment.

As shown in FIG. 3, the cross current prevention circuit 12 includes a buffer circuit 12a into which the drive voltage switching signal S1 is input. The buffer circuit 12a is a circuit including diodes, resistors, a capacitor, and semiconductor switches (bipolar transistors).

The cross current prevention circuit 12 includes an RC filter 12b and an RC filter 12c into which an output signal from the buffer circuit 12a is input. A common signal is input from the buffer circuit 12a into each of the RC filter 12b and the RC filter 12c. Each of the RC filter 12b and the RC filter 12c includes diodes, resistors, and a capacitor.

The cross current prevention circuit 12 includes a comparator 12d into which an output signal from the RC filter 12b is input. The cross current prevention circuit 12 further includes a comparator 12e into which an output signal from the RC filter 12c is input. Specifically, the output signal from the RC filter 12b and the output signal from the RC filter 12c are input into a + pin of the comparator 12d and a + pin of the comparator 12e, respectively. The comparator 12d and the comparator 12e have the same structure.

The cross current prevention circuit 12 includes a MOSFET (Metal-Oxide-Semiconductor Field-Effect Transistor) 12f into which an output signal from the comparator 12d is input, and a MOSFET 12g into which an output signal from the comparator 12e is input. The MOSFET 12f and the MOSFET 12g have the same structure.

A voltage V1 is applied to a gate of the MOSFET 12f. A voltage V2 is applied to a gate of the MOSFET 12g. The source side of each of the MOSFET 12f and the MOSFET 12g is grounded. The drain side of the MOSFET 12f is connected to a DC power source 105 via the wiring 10a and the switching relay 10 (operating coil 10b). The drain side of the MOSFET 12g is connected to a DC power source 105 via the wiring 11a and the switching relay 11 (operating coil 11b).

When the drive voltage switching signal S1 is a low-level signal, the voltage V1 applied to the gate of the MOSFET 12f becomes a predetermined positive voltage, and the MOSFET 12f is turned on. When the MOSFET 12f is turned on, a current flows from the DC power source 105 to the ground via the operating coil 10b and the wiring 10a. Thus, the switching relay 10 is excited.

When the drive voltage switching signal S1 is a low-level signal, the voltage V2 applied to the gate of the MOSFET 12g becomes a predetermined positive voltage, and the MOSFET 12g is turned on. When the MOSFET 12g is turned on, a current flows from the DC power source 105 to the ground via the operating coil 11b and the wiring 11a. Thus, the switching relay 11 is excited. Each of the MOSFET 12f and the MOSFET 12g is an n-type MOSFET.

When the drive voltage switching signal S1 is a high-level signal, each of the voltage V1 and the voltage V2 becomes a voltage value in the vicinity of 0 V, and each of the MOSFET 12f and the MOSFET 12g is turned off. Thus, no current flows through each of the switching relay 10 (operating coil 10b) and the switching relay 11 (operating coil 11b). Consequently, each of the switching relay 10 and the switching relay 11 is demagnetized.

Figure 4:
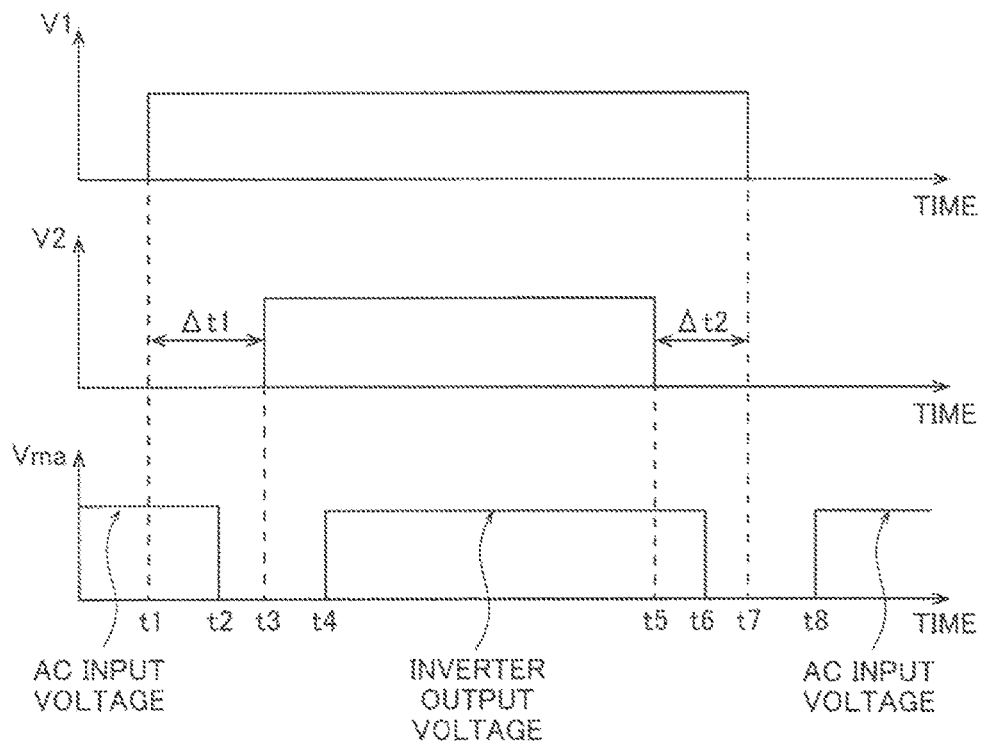
FIG. 4 is a time chart for illustrating a switching method of the inverter-side switch according to the embodiment.

According to this embodiment, as shown in FIG. 4, the switching relay 11 (see FIG. 3) is excited based on the first drive voltage switching signal $S1_L$ after a shifting time Δt1 from a time t1 when the switching relay 10 (see FIG. 3) is excited based on the first drive voltage switching signal $S1_L$ (low-level drive voltage switching signal S1). Specifically, the switching relay 11 is excited at a time t3, which is after the shifting time Δt1 from the time t1, based on the first drive voltage switching signal $S1_L$. Note that a time when the MOSFET 12f (MOSFET 12g) (see FIG. 3) is turned on by the voltage V1 (voltage V2) is regarded as a time when the switching relay 10 (switching relay 11) is excited. The shifting time Δt1 is an example of a "predetermined first shifting time" in the claims.

More specifically, the time constant of the RC filter 12b (see FIG. 3) is smaller than the time constant of the RC filter 12c (see FIG. 3). Thus, a signal is substantially simultaneously input from the buffer circuit 12a (see FIG. 3) into each of the RC filter 12b and the RC filter 12c, and hence after the signal is output from the RC filter 12b, the signal is output from the RC filter 12c. That is, a lag is provided between a time when the signal is output from the RC filter 12b and a time when the signal is output from the RC filter 12c. Consequently, the shifting time Δt1 is provided between the time t1 when the switching relay 10 is excited and the time t3 when the switching relay 11 is excited.

The switching relay 10 is excited based on the first drive voltage switching signal $S1_L$ to switch to an off-state at a time t2. The switching relay 11 is excited based on the first drive voltage switching signal $S1_L$ to switch to an on-state at a time t4.

That is, according to this embodiment, a period, during which both the switching relay 10 (see FIG. 3) and the switching relay 11 (see FIG. 3) are in an off-state when switching between the AC voltage from the main AC input power source 1a and the AC voltage from the inverter 4 capable of being supplied independently of the AC voltage from the main AC input power source 1a so as to excite the electromagnetic contactor 7a (see FIG. 1), is set. Specifically, during a period from the time t2 to the time t4, both the switching relay 10 and the switching relay 11 are in an off-state. During a period from a time t6 to a time t8 described later, both the switching relay 10 and the switching relay 11 are also in an off-state.

According to this embodiment, the shifting time Δt1 is set such that the time period between the time t2 and the time t4 is shorter than a recovery time from when the electromagnetic contactor 7a (see FIG. 1) changes from an excited state to a demagnetized state until when the electromagnetic contactor 7a switches to an off-state.

Specifically, no voltage is applied to the electromagnetic contactor 7a during the period from the time t2 to the time t4. The electromagnetic contactor 7a switches from an on-state to an off-state after the recovery time from a time when a voltage is no longer applied. Therefore, the time (t4–t2) is shorter than the recovery time of the electromagnetic contactor 7a such that the electromagnetic contactor 7a does not switch to an off-state but is maintained in an on-state.

According to this embodiment, the switching relay 10 is demagnetized based on the second drive voltage switching signal $S1_H$ after a shifting time Δt2 from a time t5 when the switching relay 11 is demagnetized based on the second drive voltage switching signal $S1_H$ (high-level drive voltage switching signal S1). Specifically, the switching relay 10 is demagnetized at a time t7, which is after the shifting time Δt2 from the time t5, based on the second drive voltage switching signal $S1_H$. Note that a time when the MOSFET 12f (MOSFET 12g) is turned off is regarded as a time when the switching relay 10 (switching relay 11) is demagnetized. The shifting time Δt2 is an example of a "predetermined second shifting time" in the claims.

The switching relay 11 is demagnetized based on the second drive voltage switching signal $S1_H$ to switch to an off-state at the time t6. The switching relay 10 is demagnetized based on the second drive voltage switching signal $S1_H$ to switch to an on-state at the time t8.

The shifting time Δt2 is set such that the time period between the time t6 and the time t8 is shorter than the recovery time of the electromagnetic contactor 7a.

Specifically, no voltage is applied to the electromagnetic contactor 7a during the period from the time t6 to the time t8. Therefore, the time (t8–t6) is shorter than the recovery time of the electromagnetic contactor 7a, and hence the electromagnetic contactor 7a does not switch to an off-state but is maintained in an on-state.

The switching relay 10 and the switching relay 11 are switched as described above such that the AC voltage of the main AC input power source 1a (see FIG. 1) is applied to the electromagnetic contactor 7a until the time t2, and no voltage is applied thereto from the time t2 until the time t4. Furthermore, the AC voltage of the inverter 4 (see FIG. 1) is applied to the electromagnetic contactor 7a from the time t4 until the time t6, no voltage is applied thereto from the time t6 until the time t8, and after the time t8, the AC voltage of the main AC input power source 1a is applied thereto.

(Structure of Bypass-Side Switch)

Next, the structure of the bypass-side switch 8b is described in detail below with reference to FIGS. 5 to 7.

Figure 5:
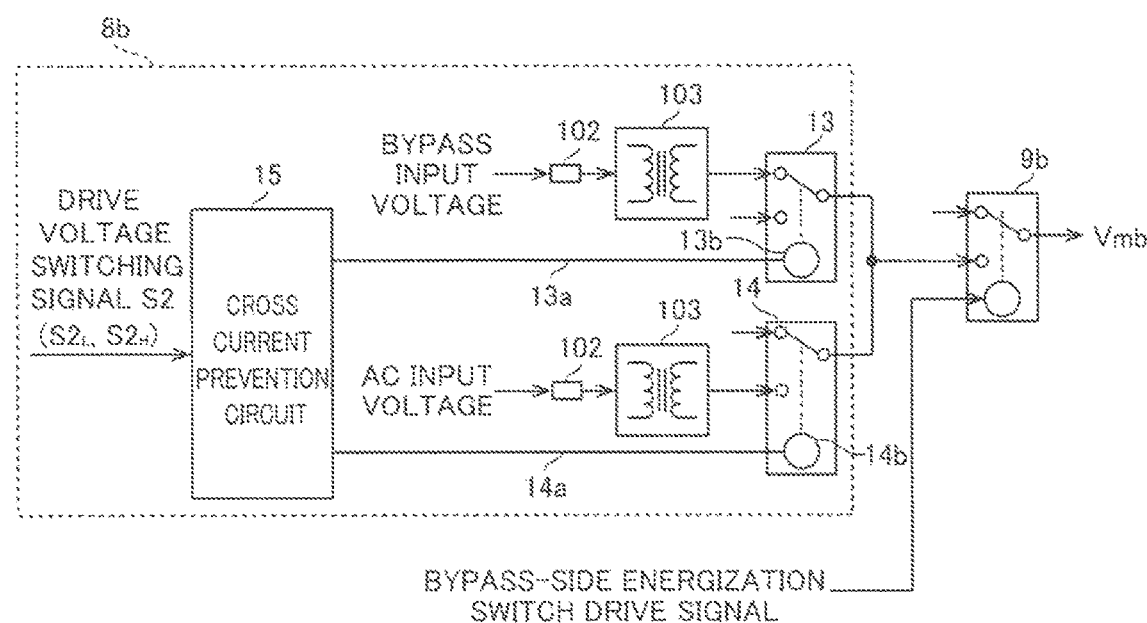
FIG. 5 is a diagram showing the structure of a bypass-side switch of the uninterruptible power supply according to the embodiment.

As shown in FIG. 5, the bypass-side switch 8b includes at least one switching relay. Specifically, the bypass-side switch 8b includes a switching relay 13 and a switching relay 14. The switching relay 13 is a b-contact mechanical relay. The AC voltage from the bypass AC input power source 1b (see FIG. 1) is input into the switching relay 13. The switching relay 14 is an a-contact mechanical relay. The AC voltage from the main AC input power source 1a (see FIG. 1) is input into the switching relay 14. The AC voltage is input into each of the switching relay 13 and the switching relay 14 via fuses 102 and transformers 103. The switching relay 13 and the switching relay 14 are examples of a "first switching relay" and a "second switching relay" in the claims, respectively.

According to this embodiment, the uninterruptible power supply 100 (see FIG. 1) turns on the switching relay 13 and turns off the switching relay 14 so as to excite the electromagnetic contactor 7b (see FIG. 1) with the AC voltage of the bypass AC input power source 1b. Specifically, the switching relay 13 is turned on, and the switching relay 14 is turned off such that the AC voltage of the bypass AC input power source 1b is input into the bypass-side energization switch 9b via the switching relay 13. The AC voltage of the main AC input power source 1a is shut off by the switching relay 14 in an off-state. In this case, when the bypass-side energization switch 9b is in an on-state, the AC voltage of the bypass AC input power source 1b is applied to the electromagnetic contactor 7b. The bypass-side energization switch 9b is switched on or off by a bypass-side energization switch drive signal input thereinto.

Furthermore, the uninterruptible power supply 100 (see FIG. 1) turns off the switching relay 13 and turns on the switching relay 14 so as to excite the electromagnetic contactor 7b (see FIG. 1) with the AC voltage of the main AC input power source 1a (see FIG. 1). Specifically, the switching relay 13 is turned off, and the switching relay 14 is turned on such that the AC voltage of the main AC input power source 1a is input into the bypass-side energization switch 9b via the switching relay 14. The AC voltage of the bypass AC input power source 1b is shut off by the switching relay 13 in an off-state. In this case, when the bypass-side energization switch 9b is in an on-state, the AC voltage of the main AC input power source 1a is applied to the electromagnetic contactor 7b.

The bypass-side switch 8b includes a cross current prevention circuit 15. A single drive voltage switching signal S2 different from the drive voltage switching signal S1 input into the inverter-side switch 8a is input into the cross current prevention circuit 15. The cross current prevention circuit 15 is connected to an operating coil 13b of the switching relay 13 via wiring 13a. The cross current prevention circuit 15 is also connected to an operating coil 14b of the switching relay 14 via wiring 14a.

According to this embodiment, the switching relay 13 and the switching relay 14 are driven based on a common first drive voltage switching signal $S2_L$ or a common second drive voltage switching signal $S2_H$. The first drive voltage switching signal $S2_L$ is a drive voltage switching signal S2 in a low level state, and the second drive voltage switching signal $S2_H$ is a drive voltage switching signal S2 in a high level state.

The switching relay 13 is turned off by being excited based on the first drive voltage switching signal $S2_L$, and is turned on by being demagnetized based on the second drive voltage switching signal $S2_H$. The switching relay 14 is turned on by being excited based on the first drive voltage switching signal $S2_L$, and is turned off by being demagnetized based on the second drive voltage switching signal $S2_H$.

Figure 6:
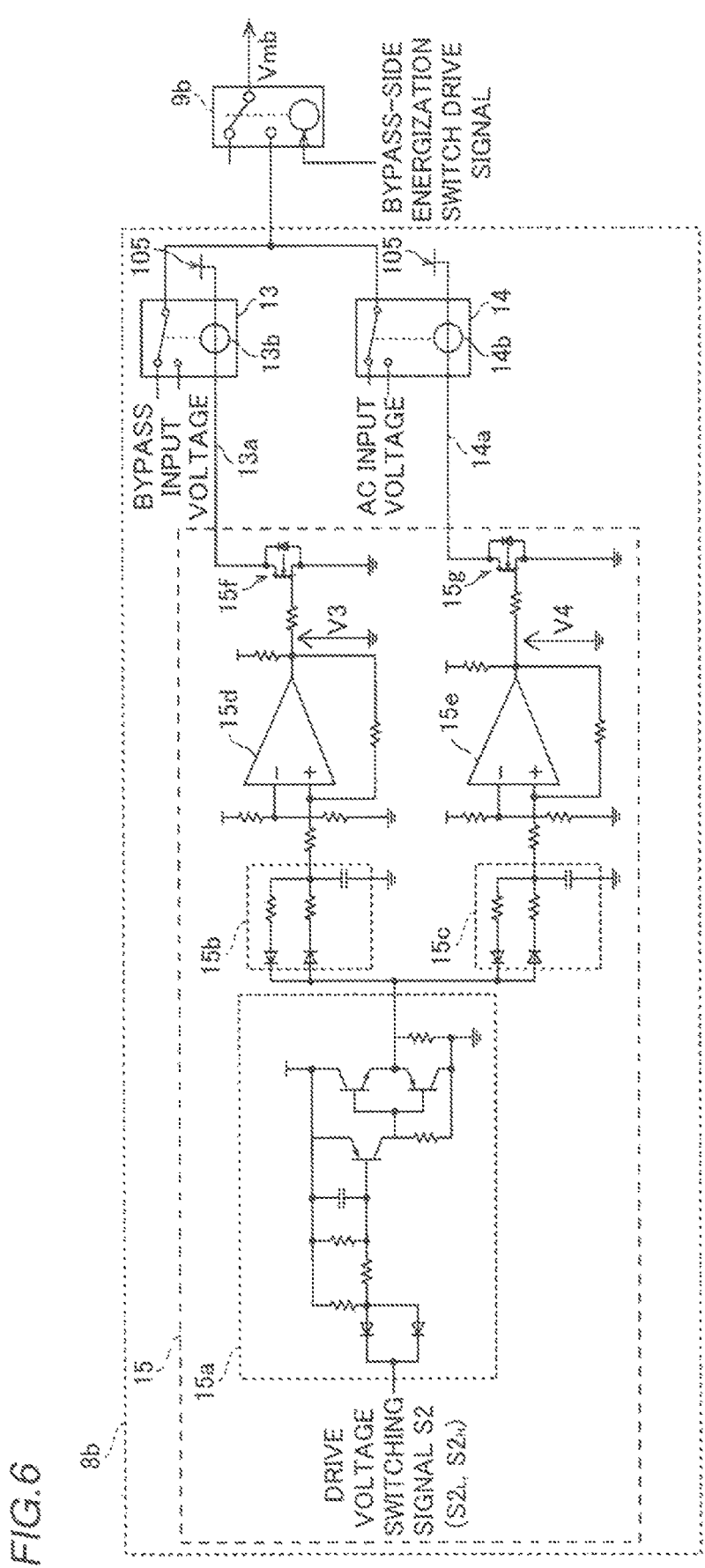
FIG. 6 is a diagram showing the detailed structure of the bypass-side switch according to the embodiment.

As shown in FIG. 6, the cross current prevention circuit 15 includes a buffer circuit 15a, an RC filter 15b, an RC filter 15c, a comparator 15d, a comparator 15e, a MOSFET 15f, and a MOSFET 15g. A voltage V3 is applied to a gate of the MOSFET 15f, and a voltage V4 is applied to a gate of the MOSFET 15g. The structure and operation of the cross current prevention circuit 15 are the same as those of the cross current prevention circuit 12, and hence a detailed description thereof is omitted. In FIG. 6, the fuses 102 (see FIG. 5) and the transformers 103 (see FIG. 5) are not shown for the sake of simplicity.

According to this embodiment, as shown in FIG. 7, the switching relay 14 (see FIG. 6) is excited based on the first drive voltage switching signal $S2_L$ at a time t13 after a shifting time Δt3 from a time t11 when the switching relay 13 (see FIG. 6) is excited based on the first drive voltage switching signal $S2_L$ (low-level drive voltage switching signal S2). The shifting time Δt3 is an example of a "predetermined first shifting time" in the claims.

Specifically, the time constant of the RC filter 15b (see FIG. 6) is smaller than the time constant of the RC filter 15c (see FIG. 6). Thus, a lag is provided between a time when the signal is output from the RC filter 15b and a time when the signal is output from the RC filter 15c. Consequently, the shifting time Δt3 is provided between the time t11 when the switching relay 13 is excited and the time t13 when the switching relay 14 is excited.

The switching relay 13 is excited based on the first drive voltage switching signal $S2_L$ to switch to an off-state at a time t12. The switching relay 14 is excited based on the first drive voltage switching signal $S2_L$ to switch to an on-state at a time t14.

That is, according to this embodiment, a period, during which both the switching relay 13 (see FIG. 5) and the switching relay 14 (see FIG. 5) are in an off-state when switching between the AC voltage from the main AC input power source 1a and the AC voltage from the bypass AC input power source 1b capable of being supplied independently of the AC voltage from the main AC input power source 1a so as to excite the electromagnetic contactor 7b (see FIG. 1), is set. Specifically, during a period from the time t12 to the time t14, both the switching relay 13 and the switching relay 14 are in an off-state. During a period from a time t16 to a time t18 described later, both the switching relay 13 and the switching relay 14 are also in an off-state.

According to this embodiment, the shifting time Δt3 is set such that the time period between the time t12 and the time t14 is shorter than a recovery time from when the electromagnetic contactor 7b (see FIG. 1) changes from an excited state to a demagnetized state until when the electromagnetic contactor 7b switches to an off-state.

According to this embodiment, the switching relay 13 is demagnetized based on the second drive voltage switching signal $S2_H$ at a time t17 after a shifting time Δt4 from a time t15 when the switching relay 14 is demagnetized based on the second drive voltage switching signal $S2_H$ (high-level drive voltage switching signal S2). The shifting time Δt4 is an example of a "predetermined second shifting time" in the claims.

The switching relay 14 is demagnetized based on the second drive voltage switching signal $S2_H$ to switch to an off-state at the time t16. The switching relay 13 is demagnetized based on the second drive voltage switching signal $S2_H$ to switch to an on-state at the time t18.

The shifting time Δt4 is set such that the time period between the time t16 and the time t18 is shorter than the recovery time of the electromagnetic contactor 7b.

The switching relay 13 and the switching relay 14 are switched as described above such that the AC voltage of the bypass AC input power source 1b (see FIG. 1) is applied to the electromagnetic contactor 7b until the time t12, and no voltage is applied thereto from the time t12 until the time t14. Furthermore, the AC voltage of the main AC input power source 1a (see FIG. 1) is applied to the electromagnetic contactor 7b from the time t14 until the time t16, no voltage is applied thereto from the time t16 until the time t18, and after the time t18, the AC voltage of the bypass AC input power source 1b is applied thereto.

Effects of Embodiment

According to this embodiment, the following effects can be obtained. In the following description, as to common effects between the effects of the inverter-side switch 8a and the effects of the bypass-side switch 8b, only the effects of the inverter-side switch 8a are described.

According to this embodiment, as described above, the uninterruptible power supply 100 includes the main AC input power source 1a, the electromagnetic contactor 7a provided between the main AC input power source 1a and the load 101 and excited to be switched on or off, and the inverter-side switch 8a that switches between the AC voltage of the main AC input power source 1a and the AC voltage of the inverter 4 capable of being supplied independently of the AC voltage of the main AC input power source 1a so as to excite the electromagnetic contactor 7a. Thus, even when the AC voltage of the main AC input power source 1a cannot be supplied to the electromagnetic contactor 7a due to a power failure or the like, the AC voltage of the inverter 4 output using the power in the storage battery 2 can be supplied to the electromagnetic contactor 7a. Consequently, the electromagnetic contactor 7a can be appropriately driven (excited) even when the AC voltage of the main AC input power source 1a cannot be supplied to the electromagnetic contactor 7a in the event of an abnormality such as a power failure.

Generally, the electromagnetic contactor 7a may be driven (turned on) at a voltage approximately equal to the rated voltage of the inverter 4. In this case, when only the AC voltage of the inverter 4 is input into the electromagnetic contactor 7a, the voltage of the inverter 4 is stepped up to the rated voltage at the time of starting or restoring the inverter 4, for example, and then the electromagnetic contactor 7a is driven (turned on). Thus, the rated voltage of the inverter 4 is applied to the load 101 at the moment the electromagnetic contactor 7a is driven. In this case, the load 101 instantaneously changes from a state where no voltage is applied to a state where the relatively large rated voltage of the inverter 4 is applied, and hence an inrush current may flow to the load 101. Therefore, the inverter-side switch 8a switches between the AC voltage of the main AC input power source 1a and the AC voltage of the inverter 4 so as to excite the electromagnetic contactor 7a such that the voltage of the inverter 4 can be stepped up in a state where the electromagnetic contactor 7a is driven by the AC voltage of the main AC input power source 1a. Thus, a voltage to be applied to the load 101 can be gradually stepped up in a state where the electromagnetic contactor 7a is turned on, and hence it is possible to significantly reduce or prevent flowing of an inrush current to the load 101.

According to this embodiment, as described above, the inverter-side switch 8a includes the switching relay 10 and the switching relay 11. Furthermore, the uninterruptible power supply 100 is configured to turn on the switching relay 10 and turn off the switching relay 11 so as to excite the electromagnetic contactor 7a with the AC voltage of the main AC input power source 1a, and to turn off the switching relay 10 and turn on the switching relay 11 so as to excite the electromagnetic contactor 7a with the AC voltage of the inverter 4. Thus, the switching relay 10 and the switching relay 11 can easily switch between the AC voltage of the main AC input power source 1a and the AC voltage of the inverter 4 so as to drive (excite) the electromagnetic contactor 7a.

According to this embodiment, as described above, the switching relay 10 and the switching relay 11 are driven based on the common first drive voltage switching signal $S1_L$ or the common second drive voltage switching signal $S1_H$. Furthermore, the switching relay 10 is excited based on the first drive voltage switching signal $S1_L$ so as to be turned off, and is demagnetized based on the second drive voltage switching signal $S1_H$ so as to be turned on. Furthermore, the switching relay 11 is excited based on the first drive voltage switching signal $S1_L$ so as to be turned on, and is demagnetized based on the second drive voltage switching signal $S1_H$ so as to be turned off. Thus, based on the common first drive voltage switching signal $S1_L$ or the common second drive voltage switching signal $S1_H$, one of the switching relay 10 and the switching relay 11 can be turned on, and the other can be turned off. Consequently, switching control of the switching relay 10 and the switching relay 11 can be simplified as compared with the case where the switching relay 10 and the switching relay 11 are controlled based on different drive voltage switching signals, respectively.

According to this embodiment, as described above, the switching relay 11 is excited based on the first drive voltage switching signal $S1_L$ after the shifting time Δt1 from the time t1 when the switching relay 10 is excited based on the first drive voltage switching signal $S1_L$. In general, there is an individual difference between switching relays in the time taken from excitation to switching on or off. When the shifting time Δt1 is not provided, and a time period from when the switching relay 10 is excited based on the first drive voltage switching signal $S1_L$ until when the switching relay 10 is turned off is longer than a time period from when the switching relay 11 is excited based on the first drive voltage switching signal $S1_L$ until when the switching relay 11 is turned on, for example, a time period in which both the switching relay 10 and the switching relay 11 are in an on-state occurs. Therefore, the shifting time Δt1 is provided such that it is possible to significantly reduce or prevent the likelihood that both the switching relay 10 and the switching relay 11 are in an on-state. Thus, it is possible to significantly reduce or prevent flowing of a cross current resulting from short-circuiting of the main AC input power source 1a and the inverter 4.

According to this embodiment, as described above, the shifting time Δt1 is set such that the time period between the time t2 when the switching relay 10 is excited based on the first drive voltage switching signal $S1_L$ to switch to an off-state and the time t4 when the switching relay 11 is excited based on the first drive voltage switching signal $S1_L$ to switch to an on-state is shorter than the recovery time from when the electromagnetic contactor 7a changes from an excited state to a demagnetized state until when the electromagnetic contactor 7a switches to an off-state. Here, no voltage is applied to the electromagnetic contactor 7a (the electromagnetic contactor 7a is demagnetized) between the time when the switching relay 10 switches to an off-state and the time when the switching relay 11 switches to an on-state. That is, when the time period between the time when the switching relay 10 switches to an off-state and the time when the switching relay 11 switches to an on-state is longer than the recovery time, the electromagnetic contactor 7a is in an off-state at the time when the switching relay 11 switches to an on-state. Therefore, the shifting time Δt1 is set such that the time period between the time t2 when the switching relay 10 switches to an off-state and the time t4 when the switching relay 11 switches to an on-state is shorter than the recovery time, whereby it is possible to significantly reduce or prevent the likelihood that the electromagnetic contactor 7a is in an off-state at the time when the switching relay 11 switches to an on-state. Thus, the on- and off-states of the electromagnetic contactor 7a can be more appropriately controlled, and hence power supply to the load 101 can be more appropriately performed.

According to this embodiment, as described above, the switching relay 10 is demagnetized based on the second drive voltage switching signal $S1_H$ after the shifting time Δt2 from the time t5 when the switching relay 11 is demagnetized based on the second drive voltage switching signal $S1_H$. In general, there is an individual difference between switching relays in the time taken from demagnetization to switching on or off. When the shifting time Δt2 is not provided, and a time period from when the switching relay 11 is demagnetized based on the second drive voltage switching signal $S1_H$ until when the switching relay 11 is turned off is longer than a time period from when the switching relay 10 is demagnetized based on the second drive voltage switching signal $S2_H$ until when the switching relay 10 is turned on, for example, a time period in which both the switching relay 10 and the switching relay 11 are in an on-state occurs. Therefore, the shifting time Δt2 is provided such that it is possible to significantly reduce or prevent the likelihood that both the switching relay 10 and the switching relay 11 are in an on-state.

According to this embodiment, as described above, the period, during which both the switching relay 10 and the switching relay 11 are in an off-state when switching between the AC voltage of the main AC input power source 1a and the AC voltage of the inverter 4 capable of being supplied independently of the AC voltage of the main AC input power source 1a so as to excite the electromagnetic contactor 7a, is set. Thus, it is possible to easily significantly reduce or prevent the likelihood that both the switching relay 10 and the switching relay 11 are in an on-state, and hence it is possible to easily significantly reduce or prevent flowing of a cross current resulting from short-circuiting of the main AC input power source 1a and the inverter 4.

According to this embodiment, as described above, the uninterruptible power supply 100 includes the inverter-side energization switch 9a that switches the energization state between the inverter-side switch 8a and the electromagnetic contactor 7a. Thus, the inverter-side energization switch 9a is controlled to be turned on or off such that the state (the excited state or demagnetized state) of the electromagnetic contactor 7a can be easily switched. In addition, the inverter-side energization switch 9a can more reliably insulate a circuit (inverter-side switch 8a) that controls the driving (excited state) of the electromagnetic contactor 7a from a main circuit of the uninterruptible power supply 100.

According to this embodiment, as described above, the switches 8 include the inverter-side switch 8a that switches between the AC voltage from the main AC input power source 1a and the AC voltage from the inverter 4 so as to excite the electromagnetic contactor 7a and the bypass-side switch 8b that switches between the AC voltage from the main AC input power source 1a and the AC voltage from the bypass AC input power source 1b so as to excite the electromagnetic contactor 7b. Thus, even when the AC voltage of the main AC input power source 1a cannot be supplied to the electromagnetic contactor 7a in the event of an abnormality such as a power failure, the electromagnetic contactor 7a can be appropriately driven (excited) through the inverter-side switch 8a. Furthermore, when there is an abnormality in wiring between the bypass AC input power source 1b and the electromagnetic contactor 7b and the AC voltage of the bypass AC input power source 1b is not applied to the electromagnetic contactor 7b, the electromagnetic contactor 7b can be driven (excited) by the AC voltage from the main AC input power source 1a through the bypass-side switch 8b. Specifically, when the fuse 102 provided on the switching relay 13 side into which the AC voltage of the bypass AC input power source 1b is input blows (is broken), the AC voltage of the bypass AC input power source 1b cannot be applied to the electromagnetic contactor 7b despite the fact that an AC voltage is normally output from the bypass AC input power source 1b. In this case, the switching relay 13 is turned off, and the switching relay 14 is turned on such that the electromagnetic contactor 7b can be driven (excited) by the AC voltage of the main AC input power source 1a.

Modified Examples

The embodiment disclosed this time must be considered as illustrative in all points and not restrictive. The range of the present invention is shown not by the above description of the embodiment but by the scope of claims for patent, and all modifications (modified examples) within the meaning and range equivalent to the scope of claims for patent are further included.

For example, while each of the first switching relay (switching relay 10 (13)) and the second switching relay (switching relay 11 (14)) is a mechanical relay in the aforementioned embodiment, the present invention is not restricted to this. For example, each of the first switching relay (switching relay 10 (13)) and the second switching relay (switching relay 11 (14)) may alternatively be a photo MOS relay (a relay driven based on light emission when excited).

While in the power converter-side switch (inverter-side switch 8a), the first switching relay (switching relay 10) is a b-contact relay, and the second switching relay (switching relay 11) is an a-contact relay in the aforementioned embodiment, the present invention is not restricted to this. For example, the first switching relay (switching relay 10) may alternatively be an a-contact relay, and the second switching relay (switching relay 11) may alternatively be a b-contact relay. Also in the bypass-side switch, the first switching relay (switching relay 13) may alternatively be an a-contact relay, and the second switching relay (switching relay 14) may alternatively be a b-contact relay.

While the power converter-side switch (inverter-side switch 8*a*) and the bypass-side switch are provided in the aforementioned embodiment, the present invention is not restricted to this. For example, only one of the power converter-side switch (inverter-side switch 8*a*) and the bypass-side switch may alternatively be provided.

While the electromagnetic contactors (the electromagnetic contactor 7*a* and the electromagnetic contactor 7*b*) are turned on when a voltage is applied thereto in the aforementioned embodiment, the present invention is not restricted to this. For example, the electromagnetic contactors (the electromagnetic contactor 7*a* and the electromagnetic contactor 7*b*) may alternatively be turned off when a voltage is applied thereto.

While the electromagnetic contactors (the electromagnetic contactor 7*a* and the electromagnetic contactor 7*b*) are normal excitation type electromagnetic contactors in the aforementioned embodiment, the present invention is not restricted to this. For example, the electromagnetic contactors (the electromagnetic contactor 7*a* and the electromagnetic contactor 7*b*) may alternatively be latch type electromagnetic contactors. Note that the latch type electromagnetic contactors are electromagnetic contactors, the closed states of which are mechanically maintained after excitation. Furthermore, the electromagnetic contactor 70 and the electromagnetic contactor 71 may alternatively be latch type electromagnetic contactors.

While each of the power converter-side switch (inverter-side switch 8*a*) and the bypass-side switch includes the two switching relays in the aforementioned embodiment, the present invention is not restricted to this. For example, each of the power converter-side switch (inverter-side switch 8*a*) and the bypass-side switch may alternatively include one, or three or more switching relays.

What is claimed is:

1. An uninterruptible power supply, comprising:
   an AC power source configured to supply AC power to a load and including a main AC input power source;
   an electromagnetic contactor configured to be provided between the AC power source and the load and excited to be switched on or off; and
   a first switch that switches between a first AC voltage from the main AC input power source and a second AC voltage capable of being supplied independently of the first AC voltage so as to excite the electromagnetic contactor,
   wherein the AC power source further includes a bypass AC input power source, and
   the electromagnetic contactor includes a first electromagnetic contactor configured to be provided between the main AC input power source and the load and a second electromagnetic contactor configured to be provided between the bypass AC input power source and the load,
   the uninterruptible power supply further comprising:
   a power storage that stores DC power; and
   a power converter that converts the DC power from the power storage into AC power, wherein
   the first switch includes a power converter-side switch that switches between the first AC voltage from the main AC input power source and the second AC voltage as an AC voltage from the power converter so as to excite the first electromagnetic contactor, and a bypass-side switch that switches between the first AC voltage from the main AC input power source and the second AC voltage as an AC voltage from the bypass AC input power source so as to excite the second electromagnetic contactor.

2. The uninterruptible power supply according to claim 1, wherein the power converter-side switch includes at least one switching relay, and the switching relay switches between the first AC voltage and the second AC voltage so as to excite the electromagnetic contactor.

3. The uninterruptible power supply according to claim 2, wherein the power converter-side switch includes a first switching relay and a second switching relay, and
   the first switching relay is turned on and the second switching relay is turned off so as to excite the electromagnetic contactor with one of the first AC voltage and the second AC voltage, and the first switching relay is turned off and the second switching relay is turned on so as to excite the electromagnetic contactor with the other of the first AC voltage and the second AC voltage.

4. The uninterruptible power supply according to claim 3, wherein
   the first switching relay and the second switching relay are driven based on a common first drive voltage switching signal or a common second drive voltage switching signal,
   the first switching relay is excited based on the first drive voltage switching signal so as to be turned off, and is demagnetized based on the second drive voltage switching signal so as to be turned on, and
   the second switching relay is excited based on the first drive voltage switching signal so as to be turned on, and is demagnetized based on the second drive voltage switching signal so as to be turned off.

5. The uninterruptible power supply according to claim 4, wherein
   the second switching relay is excited based on the first drive voltage switching signal after a predetermined first shifting time from a time when the first switching relay is excited based on the first drive voltage switching signal.

6. The uninterruptible power supply according to claim 4, wherein
   the first switching relay is demagnetized based on the second drive voltage switching signal after a predetermined second shifting time from a time when the second switching relay is demagnetized based on the second drive voltage switching signal.

7. The uninterruptible power supply according to claim 3, wherein
   a period, during which the first switching relay and the second switching relay are in an off-state when switching between the first AC voltage from the main AC input power source and the second AC voltage capable of being supplied independently of the first AC voltage so as to excite the electromagnetic contactor, is set.

8. The uninterruptible power supply according to claim 1, further comprising a second switch that switches an energization state between the first switch and the electromagnetic contactor.

9. An uninterruptible power supply, comprising:
   an AC power source configured to supply AC power to a load and including a main AC input power source;

an electromagnetic contactor configured to be provided between the AC power source and the load and excited to be switched on or off; and a first switch that switches between a first AC voltage from the main AC input power source and a second AC voltage capable of being supplied independently of the first AC voltage so as to excite the electromagnetic contactor;

wherein the first switch includes at least one switching relay, and the switching relay switches between the first AC voltage and the second AC voltage so as to excite the electromagnetic contactor, wherein the first switch includes a first switching relay and a second switching relay, and the first switching relay is turned on and the second switching relay is turned off so as to excite the electromagnetic contactor with one of the first AC voltage and the second AC voltage, and the first switching relay is turned off and the second switching relay is turned on so as to excite the electromagnetic contactor with the other of the first AC voltage and the second AC voltage, wherein the first switching relay and the second switching relay are driven based on a common first drive voltage switching signal or a common second drive voltage switching signal, the first switching relay is excited based on the first drive voltage switching signal so as to be turned off, and is demagnetized based on the second drive voltage switching signal so as to be turned on, and the second switching relay is excited based on the first drive voltage switching signal so as to be turned on, and is demagnetized based on the second drive voltage switching signal so as to be turned off, wherein the second switching relay is excited based on the first drive voltage switching signal after a predetermined first shifting time from a time when the first switching relay is excited based on the first drive voltage switching signal, and wherein the electromagnetic contactor is a normal excitation electromagnetic contactor, and the predetermined first shifting time is set such that a time period between a time when the first switching relay is excited based on the first drive voltage switching signal to switch to an off-state and a time when the second switching relay is excited based on the first drive voltage switching signal to switch to an on-state is shorter than a recovery time from when the normal excitation electromagnetic contactor changes from an excited state to a demagnetized state until when the normal excitation type electromagnetic contactor switches to an off-state.

* * * * *